July 22, 1924.

O. E. HANSON

DRAWBAR ATTACHMENT FOR FORDSON TRACTORS

Filed June 2, 1923

1,502,033

INVENTOR
Ole E. Hanson

Mason Fenwick & Lawrence,
ATTORNEYS

Patented July 22, 1924.

1,502,033

UNITED STATES PATENT OFFICE.

OLE E. HANSON, OF POULSBO, WASHINGTON.

DRAWBAR ATTACHMENT FOR FORDSON TRACTORS.

Application filed June 2, 1923. Serial No. 643,047.

*To all whom it may concern:*

Be it known that I, OLE E. HANSON, a citizen of the United States, residing at Poulsbo, in the county of Kitsap and State of Washington, have invented certain new and useful Improvements in Drawbar Attachments for Fordson Tractors; and I do hereby declare the following to be a full, clear, and exact description of the invention, such as will enable others skilled in the art to which it appertains to make and use the same.

This invention relates to drawbars for tractors, and particularly to drawbar attachments for Fordson tractors, and especially to an auxiliary drawbar attached to the tractor at a point on the bottom thereof at a distance from the rear, and guided from the regular drawbar extending from the rear of the tractor.

The objects of the invention are to provide an auxiliary drawbar and attachments for connection with the regular drawbar whereby the point of attachment of the front of the auxiliary drawbar will be carried forward from the rear of the tractor to a point about midway the length of the tractor, and the regular drawbar at the extreme rear of the tractor to be used to hold a guide for the new or auxiliary drawbar.

In the usual construction of tractors, particularly that common form known as "Fordson" and other tractors used for drawing farming implements such as plows, disc harrows, etc., a short bar is provided which is secured to the rear of the tractor centrally between the sides and extends a short distance back for connection with the front end of the plow beams or disc harrow, etc. In practice this arrangement has been found very unsatisfactory in many cases and particularly when the tractor is used for pulling plows on a hillside, where owing to the tendency of the tractor to slide it is necessary to travel with the front end turned slightly above the line of the furrow, and this position throws the rear on an angle with the furrow and it is impossible to prevent the plow from frequently "running out" and losing its position with a proper width of earth. Again, in attempting to turn the tractor and implement, particularly a disc harrow, it is impossible to make a short turn, which is desirable at the corners, for the reason that the drag of the following implement will fall with its entire strain on the drawbar end extending beyond the rear of the tractor, and the leverage will thus prevent the tractor from making a short turn; and it is to overcome these difficulties and others that I have invented the following described apparatus.

I have illustrated my invention by the accompanying drawings:—

Figure 1:
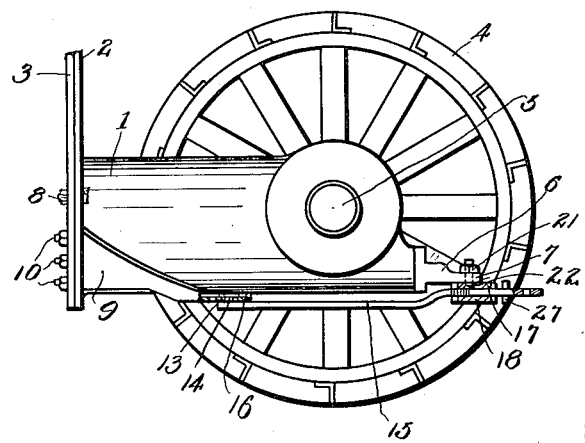
Figure 1 is a side elevation of my invention with parts broken away and showing its attachment to the body of a tractor.
Figure 2:
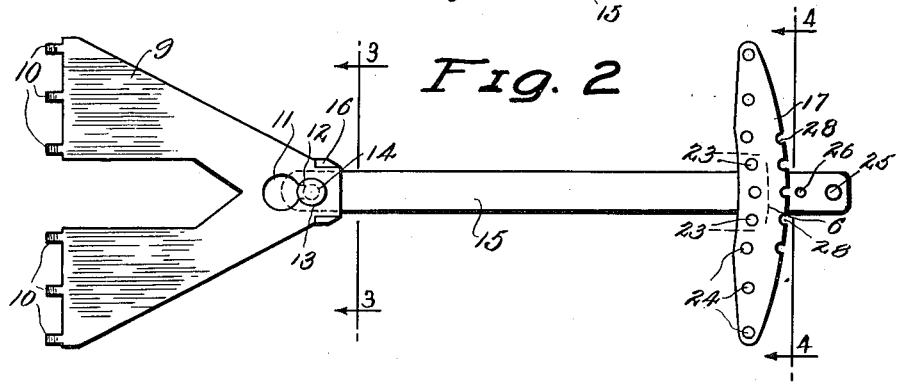
Fig. 2 is a top plan of the invention.
Figure 4:
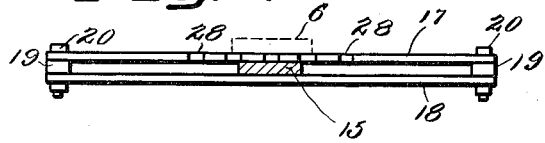
Fig. 4 is a transverse sectional view taken on lines 4—4 of Fig. 2.
Figure 3:
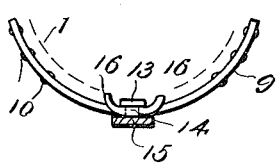
Fig. 3 is a transverse sectional view taken on lines 3—3 of Fig. 2.

Like numerals on different figures represent like parts. 1 is the body or rear portion of the frame of any tractor with the front edge turned at right angles to form a flange 2 which is ordinarily bolted to the flange 3 of the front portion of the frame (the frame itself not shown) and 4 is one of the ordinary tractor wheels on axle 5, from which the wheel on the near side is removed for better illustrating the invention. A common short drawbar 6 is regularly affixed at the rear end of frame 1 with holes 7 therethrough for connecting with any implement to be drawn by the tractor.

In attaching my improvement I remove the lower connecting bolts 8 which normally hold the flanges 2 and 3 together, and attach a plate 9 which is of roughly triangular form bent on its medial axis to semi-cylindrical form to conform with the shape of the tractor frame and provided on its rear edge with a series of stud bolts 10—10, which stud bolts I insert in lieu of the bolts 8 and therewith bind the plate and both flanges securely together. The rear or small end is provided with a large circular opening 11 having a small slot 12 extending from its rear edge to permit the large head 13 of king bolt 14 to be inserted, the head through the large opening and the bolt then to be drawn into the slot, the bolt securing to the blank 9 the auxiliary drawbar 15 which extends back along the under side of the frame 1 and beyond the outer end of the regular bar 6. The edges of the rear and narrow end of plate 9 are turned up to form bearing points 16 which rest against the bottom of the frame and permit the bolt head 13 to be readily inserted. As guides for the rear end of bar 15 I provide duplicate plates 17 and 18, the former bolted to the under side of bar 6 by bolts 21 with countersunk heads 22, the bolts passing up through holes 23 in the guide 17 corresponding with holes 7 in the bar 6. Spacing blocks 19 are held by binding bolts 20, one at each end of the guides, which hold the guides suitably spaced to permit the bar 15 to be readily operated between the two.

The guides have a series of corresponding holes 24 through which any suitable bolt or pin may be adjusted for determining the distance which the end of the bar 15 may be moved toward either side of the tractor, which is connected by means of the hole 25 in its end to the drawn implement. A hole 26 through bar 15 holds a cross pin 27 which may be adjusted into any one of a series of notches 28 across the back edges of the guides in cases where it is desired to move the attached implement backward, the pin being so spaced that it will strike the bed of a notch before the bolt 14 is moved from the slot 12.

It will be understood that the connection of the bar 15 at the point distanced from the rear of the tractor and at the bottom of the frame will tend to prevent the tractor tipping up in front, as is frequently the case when a sudden strain is brought against (common) drawbar attached only to the extreme rear end. The length of the bar 15 will also give a longer length or distance between the points of attachment of the two ends of the bar, thus lessening the angle of the conecting means with the following implement, so that the tractor may be readily turned shortly around at the desired places, as at the end of a field; and in cases where it is desired to hold the front end of the implement to either side of the center of the tractor, the rear end of the bar 15 may be positioned as desired by the guide pins in the holes 24.

While for illustration I have shown a particular form of apparatus attached to a particular form of tractor, yet I do not wish to limit my invention to such particular forms, but the structure may be changed to fit any other forms of tractors, and for other uses than specifically herein set out within the scope of the present invention as claimed.

Having thus fully described my invention, I claim as new:

A drawbar attachment for tractors, comprising a connecting plate having a round and slotted opening in the free end thereof, with an extension drawbar held by pivotal means through the slot at one end and the other end of the bar extending beyond the rear end of the tractor, guide plates attached to the rear of the tractor above and below the extending bar, and means for holding the rear end of the bar at a predetermined position between the guides plates, notches across the back edges of the guides and a pin through the bar for seating in the notches.

In testimony whereof I affix my signature.

OLE E. HANSON.